July 15, 1969    J. GERSCH    3,455,519

MAGAZINE FOR MOTION PICTURE FILM

Filed Dec. 22, 1967

INVENTOR.

JOSEF GERSCH

BY Michael S. Striker

Attorney

United States Patent Office 3,455,519
Patented July 15, 1969

3,455,519
MAGAZINE FOR MOTION PICTURE FILM
Josef Gersch, Unterhaching, Germany, assignor to Agfa-Gevaert Aktiengesellschaft, Leverkusen, Germany
Filed Dec. 22, 1967, Ser. No. 692,949
Claims priority, application Germany, Dec. 24, 1966, A 26,916
Int. Cl. C03b 1/64
U.S. Cl. 242—71.2　　　　　　　　　　　10 Claims

ABSTRACT OF THE DISCLOSURE

A magagazine for motion picture roll film wherein a partition 15 of the housing separates two chambers A, B which respectively accommodate coaxial cores 10, 6 for exposed and unexposed film. A blocking element 8 has ratchet teeth 8A to engage projections 10g on core 10 to prevent rotation in one direction. Excessive wobbling of element 8 is prevented by lugs 6b and retaining ring 10e.

Background of the invention

The present invention relates to magazines or cassettes for motion picture film, and more particularly to improvements in magazines of the type wherein the exposed frames of roll film are stored coaxially with unexposed frames.

In conventional cameras of the just outlined character, the chamber for exposed film accommodates a rotary core having projections cooperating with teeth of an annular blocking element to prevent unwinding of exposed film. The core is free to rotate in a sense to draw exposed film into its chamber because the blocking element can yield radially. It was found that the blocking element, which must have some freedom of axial movement with reference to the housing of the magazine, is likely to wobble in response to rough handling of the magazine and its teeth then allow unwinding of exposed film.

Summary of the invention

It is an object of my invention to provide a magazine for motion picture film wherein a rotary first core can be coupled to the motor of a motion picture camera to draw film from a coaxial second core and wherein exposed film collected by the rotary core is held against unwinding in a novel and improved way.

Another object of the invention is to provide the magazine with novel retaining means for the device which cooperates with the rotary core to prevent unwinding of exposed film.

A further object of the invention is to provide a magazine which can withstand rough handling, including dropping by a careless operator, without permitting unwinding of exposed film and wherein the means for preventing such unwinding need not occupy more room than in conventional magazines.

The novel features which are considered as characteristic of the invention are set forth in particular in the appended claims. The improved magazine itself, however, both as to its construction and its mode of operation, together with additional features and advantages thereof, will be best understood upon perusal of the following detailed description of certain specific embodiments with reference to the accompanying drawing.

Description of the preferred embodiments

Figure 2:
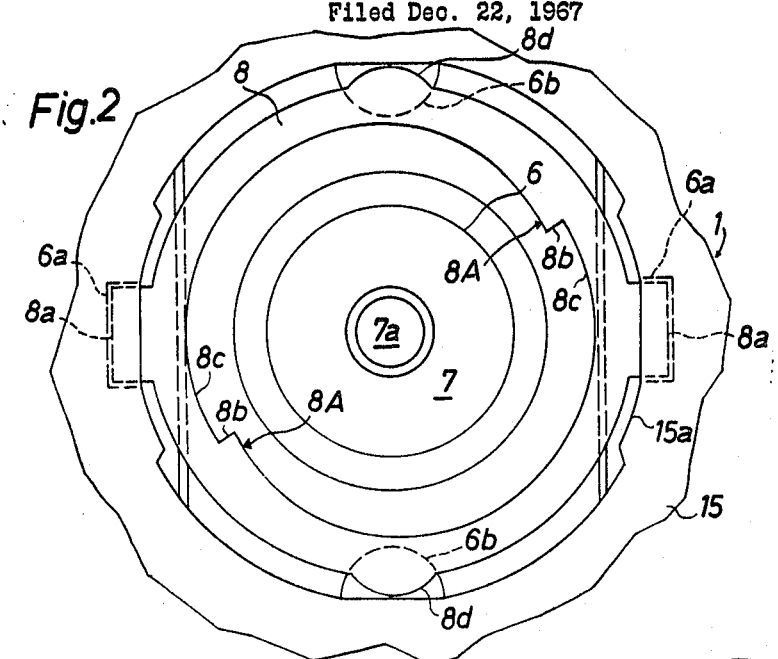
FIG. 2 is a view substantially as seen in the direction of arrows from the line II—II of FIG. 1, with one core member omitted.

The drawing illustrates a magazine or cassette for motion picture roll film. The magazine comprises a housing including a main body portion 1 and two covers or lids 2 and 3. The body portion 1 defines two chambers A and B which respectively serve for storage of exposed and unexposed film. The unexposed film is drawn from the chamber B by a rotary core member 10 which is accommodated in the chamber A and has a coupling portion 10b adapted to receive torque from the output shaft of the motor in a motion picture camera when the magazine is properly inserted into such camera. Successive frames of unexposed film which is being withdrawn from the chamber B pass in front of a flat side face (not shown) of the main body portion 1 and register with the objective so that they can be exposed to scene light. The manner in which the film can be transported from the chamber B into the chamber A is known and forms no part of my invention.

Figure 1:
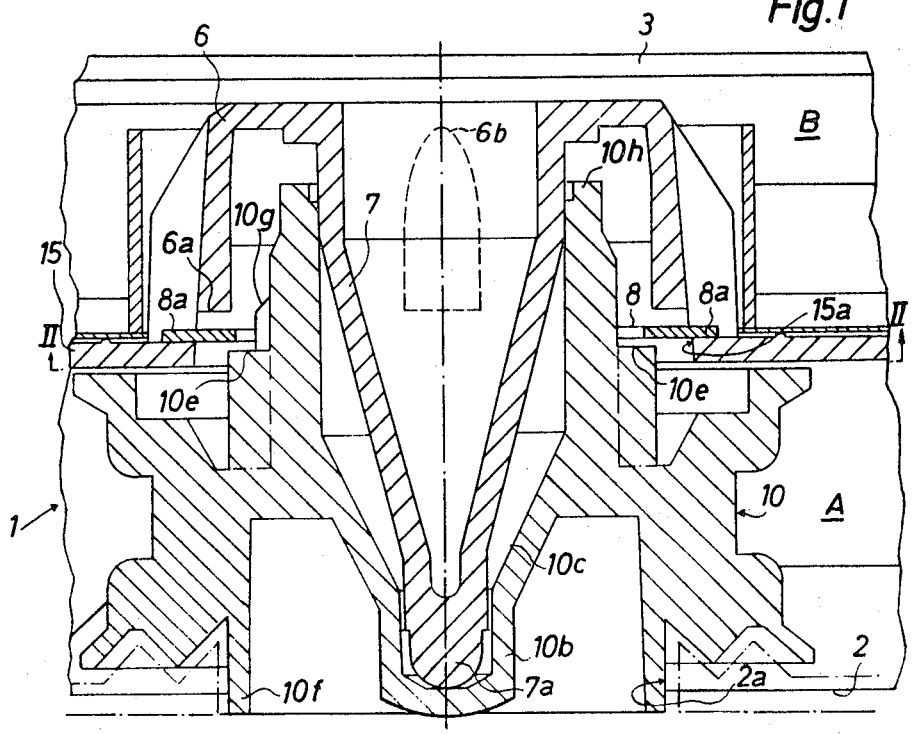
FIG. 1 is a fragmentary axial sectional view of a magazine for motion picture film which embodies the present invention.

The chamber B accommodates a ring-shaped second core member 6 which is preferably stationary and can be rigid with or may form an integral part of the main body portion 1, more particularly of a flat plate- or panel-like partition 15 which, in turn, forms part of the main body portion 1 and separates the chambers A, B from each other. The core member 6 has a conical center piece 7 which tapers toward the cover 2 and carries at its end a semispherical bearing 7a. The partition 15 is provided with a centrally located substantially circular opening 15a which receives an annular blocking element 8 acting not unlike a ratchet wheel. This blocking element 8 (hereinafter called annulus for short) has two outwardly extending radial projections or lugs 8a which extend into radial slots 6a provided in the core member 6 of the partition 15. The lugs 8a and slots 6a permit limited radial movements of the annulus 8 in a predetermined direction, namely horizontally back and forth as viewed in FIG. 2. However, the lugs 8a prevent rotation of the annulus 8 about the center of the opening 15a in the partition 15. The cover 2 has a central opening 2a receiving and centering a ring-shaped flange 10f of the rotary core member 10 so as to enable the user to properly connect the coupling portion 10b with the output shaft of the motor in a motion picture camera. Instead of being rigid or integral with the partition 15, the core member 6 for unexposed film can be made rigid with the cover 3 which closes the open side of the chamber B. For the purposes of the present description, the core member 6 will be considered a part of the partition 15 irrespective of whether it is directly connected to the partition or to the cover 3. The bearing 7a of the tapering center piece 7 is engageable by the surface in a similarly tapering socket 10c provided in the rotary core member 10. The latter is further provided with an extension or skirt 10h which passes through the central opening of the annulus 8 and has three equidistant external projections or ribs 10g (only one shown in FIG. 1). The projections 10g cooperate with two inwardly extending ratchet teeth 8A of the annulus 8, each of these teeth having a substantially radially extending flank 8b and a concave flank 8c extending from its root to the top land of the other tooth. When the core member 10 tends to rotate in a first circumferential direction (counterclockwise, as viewed in FIG. 2), one of its projections 10g engages the radial flank 8b of the adjoining ratchet tooth 8a whereby the latter prevents further rotation of the core member 10 in counterclockwise direction. However, if the core member 10 is driven by the motor of the motion picture camera, it rotates in the other circumferential direction (clockwise, as viewed in FIG. 2) whereby the projections 10g of its extension 10h slide along the concave flanks 8c and cause radial movements of the annulus 8 so that the projections 10g can bypass the teeth 8A and the core member 10 continues to rotate in the clockwise direction until the motor of the camera is arrested by the operator. Such function of the annulus 8 is known, and it is also known to provide the partition 15 or the core member 6 with two retaining portions or lugs 6b which are disposed diametrically opposite each other between the lugs 8a and overlie one side of the annulus 8 to prevent the latter from moving axially upwardly, as viewed in FIG. 1. Thus, the lugs 6b constitute a retaining means which cooperates with two lobes 8d of the annulus 8 and holds the latter against excessive axial movement in a direction toward the cover 3. The lugs 6b also limit tilting or wobbling movements of the annulus 8 about a diametral axis defined by the lugs 8a which are received with clearance in the respective slots 6a of the core member 6 (see FIG. 1). Such tilting or wobbling could enable a projection 10g to bypass the adjoining radial flank 8b of a ratchet tooth 8A whereby the exposed film in chamber A would be free to unwind. Wobbling or tilting of the annulus 8 could take place due to rough handling of the magazine, for example, if a careless operator drops the magazine when the latter is withdrawn from the housing of a motion picture camera. Since the exposed film in chamber A tends to unwind, it biases the core 10 in a counterclockwise direction, as viewed in FIG. 2, so that one of the projections 10g normally abuts against one of the radial flanks 8b. Uncontrolled unwinding of exposed film is undesirable and, therefore, I provide the magazine with novel auxiliary or second retaining means which prevents axial movements of the annulus 8 in a direction away from the retaining means 6b, i.e., toward the cover 2. The second retaining means cooperates with the retaining means 6b to prevent excessive tilting or wobbling of the annulus 8 by simultaneously providing enough clearance for substantially unrestricted radial movements of the annulus in response to travel of a projection 10g along a concave tooth flank 8c. This second retaining means comprises a ring or sleeve 10e provided on the partition 15 or on the core member 10 and having an end face extending sufficiently close to the plane of the lugs 6b to prevent excessive wobbling of the annulus. In the illustrated embodiment, the ring 10e is provided on the core member 10 and surrounds the extension 10h; its external diameter exceeds the internal diameter of the annulus 8 sufficiently to insure that the adjoining side of the annulus is overlapped by the end face of the ring 10e in all radial positions of the annulus. If the ring 10e is provided on the partition 15, its internal diameter is smaller than the external diameter of the annulus 8.

The magazine is assembled at the manufacturing plant. The cover 3 is applied to the body portion 1 upon insertion of a supply of unexposed film into the chamber B so that the unexposed film surrounds the core member 6, and the leading end of the film extends along the aforementioned side wall of the main body portion 1 and into the chamber A where it is attached to the rotary core member 10. The cover 2 is then applied over the core member 10 so that the latter's flange 10f is centered in the opening 2a. Upon insertion into a motion picture camera, coupling portion 10b of the core member 10 is engaged by the output shaft of the motor so that the core member 10 can turn and draws unexposed film from the supply which is stored on the core member 6 as soon as the motor of the camera is started.

The parts of the magazine can be made of plastic and/or metallic material, and the retaining ring 10e may form an integral part of the core member 10 or partition 15.

What is claimed as new and desired to be protected by Letters Patent is set forth in the appended claims:

1. In a magazine for motion picture roll film wherein unexposed film is stored coaxially with exposed film, a combination comprising a housing defining first and second chambers adapted to respectively accommodate exposed and unexposed film, said housing having a partitioning member disposed between said chambers and having an opening; a blocking element provided in and movable substantially radially of said opening in a predetermined direction, said element having at least one ratchet tooth; first retaining means provided on said housing adjacent to one side of said element to limit movements of said element in one axial direction; a rotary core member provided in one of said chambers at the other side of said element and having at least one projection engageable with said tooth in response to rotation in one circumferential direction so that said tooth then prevents further rotation of said core member, said projection being arranged to move said tooth and said element radially in said predetermined direction in response to rotation of said core member in the other circumferential direction; and second retaining means provided on one of said members adjacent to the other side of said element to limit movements of said element in the other axial direction.

2. A combination as defined in claim 1, wherein said first retaining means comprises at least one lug rigid with said partitioning member and overlying said one side of said blocking element.

3. A combination as defined in claim 1, wherein said second retaining means comprising a ring.

4. A combination as defined in claim 3, wherein said blocking element is an annulus and the external diameter of said ring exceeds the internal diameter of said blocking element, said ring being rotatable with said core member.

5. A combination as defined in claim 1, wherein said core member is received in said first chamber and has a coupling portion adapted to receive motion in said other circumferential direction from a prime mover in a motion picture camera.

6. A combination as defined in claim 1, wherein said blocking element is an annulus and is provided with several angularly spaced internal ratchet teeth, said core member being provided with several angularly spaced external projections and the number of said projections being different from the number of said teeth.

7. A combination as defined in claim 1, wherein said partition comprises a second core member provided in the other of said chambers and including said first retaining means.

8. A combination as defined in claim 7, wherein said second core member has a conical portion and said first mentioned core member has a conical socket rotatably receiving said conical portion, said conical portion extending with clearance through an opening of said blocking element.

9. A combination as defined in claim 1, wherein said core member has an extension passing with clearance through an opening of said blocking element and said projection is provided externally on said extension.

10. A combination as defined in claim 1, wherein said partition is a flat panel and said opening is provided in the central portion of said panel, said core member being located in said first chamber and having an extension passing with clearance through said opening and through an opening in said element and rotatably mounting a second core member rigid with said housing and located in said second chamber, said projection being provided externally on said extension and said tooth extending inwardly from an internal surface of said blocking element.

References Cited

UNITED STATES PATENTS 2,756,940    7/1956    Lessler _____ 242—71.2
3,208,686    9/1965    Edwards et al. _____ 242—71.2

NATHAN L. MINTZ, Primary Examiner